(12) United States Patent
Kito et al.

(10) Patent No.: US 10,268,557 B2
(45) Date of Patent: Apr. 23, 2019

(54) NETWORK MONITORING DEVICE, NETWORK SYSTEM, AND COMPUTER PROGRAM PRODUCT

(71) Applicant: Kabushiki Kaisha Toshiba, Minato-ku (JP)

(72) Inventors: Toshiyuki Kito, Kodaira (JP); Takeshi Kawabata, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 269 days.

(21) Appl. No.: 15/440,444

(22) Filed: Feb. 23, 2017

(65) Prior Publication Data

US 2018/0074929 A1    Mar. 15, 2018

(30) Foreign Application Priority Data

Sep. 13, 2016   (JP) ................... 2016-178932

(51) Int. Cl.
| | |
|---|---|
| *G06F 11/30* | (2006.01) |
| *G06F 11/20* | (2006.01) |
| *G06F 11/36* | (2006.01) |
| *G06F 21/56* | (2013.01) |
| *G06F 21/57* | (2013.01) |
| *G06F 11/32* | (2006.01) |

(52) U.S. Cl.
CPC ...... *G06F 11/3006* (2013.01); *G06F 11/2007* (2013.01); *G06F 11/302* (2013.01); *G06F 11/3051* (2013.01); *G06F 11/3612* (2013.01); *G06F 21/568* (2013.01); *G06F 21/575* (2013.01); *G06F 11/327* (2013.01)

(58) Field of Classification Search
None
See application file for complete search history.

(56) References Cited

U.S. PATENT DOCUMENTS

| | | | |
|---|---|---|---|
| 6,314,455 B1 | 11/2001 | Cromer et al. | |
| 2004/0044889 A1 | 3/2004 | Kamataki | |
| 2006/0174055 A1* | 8/2006 | Flynn .................. | G06F 9/4406 711/100 |
| 2010/0250061 A1 | 9/2010 | Toyofuku et al. | |

(Continued)

FOREIGN PATENT DOCUMENTS

| | | |
|---|---|---|
| EP | 2 230 502 A1 | 9/2010 |
| JP | 2014-23136 | 2/2014 |

(Continued)

*Primary Examiner* — Piotr Poltorak
(74) *Attorney, Agent, or Firm* — Oblon, McClelland, Maier & Neustadt, L.L.P.

(57) ABSTRACT

According to an embodiment, a network monitoring device that monitors a network includes a software storage and a controller. The software storage is configured to store software applied to a first electronic device connected to the network. The controller is configured to determine, in response to reception of verification result data indicating software verification failure from the first electronic device, whether a recovery condition determined in advance as a condition of recovering software in the first electronic device is satisfied, and perform a control of transmitting the software stored in the software storage to the first electronic device when it is determined that the recovery condition is satisfied.

12 Claims, 6 Drawing Sheets

(56) References Cited

U.S. PATENT DOCUMENTS

2015/0113520 A1* 4/2015 Kotani .................... G06F 8/654
                                                         717/172
2017/0139777 A1   5/2017 Gehrmann
2017/0192770 A1*  7/2017 Ujiie ....................... G06F 8/654

FOREIGN PATENT DOCUMENTS

| JP | 2014-179047 | 9/2014 |
| JP | 5864510 | 2/2016 |
| WO | WO 2016/007868 A1 | 1/2016 |

* cited by examiner

FIG.3

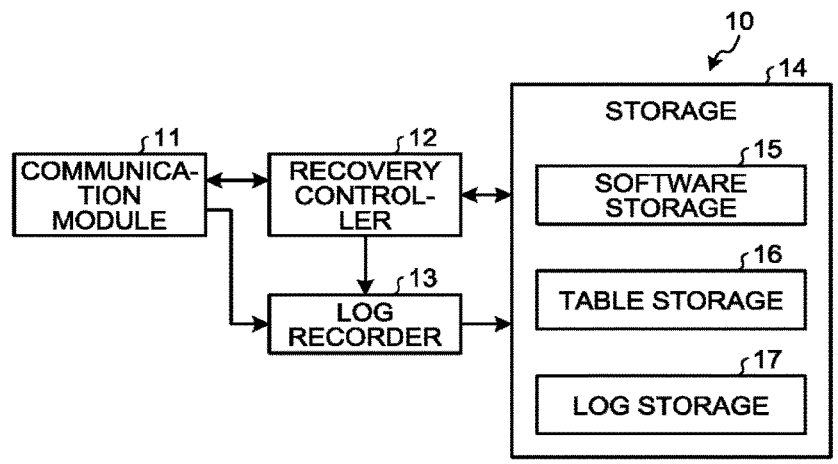

FIG.4

| ITEM | OVERVIEW |
|---|---|
| ECU ID | IDENTIFIER OF ECU |
| FW ID | IDENTIFIER OF CURRENT FIRMWARE |
| Ver.No | VERSION INFORMATION OF CURRENT FIRMWARE |
| VERIFICATION REFERENCE VALUE | VALUE THAT IS USED IN CURRENT FIRMWARE VERIFICATION |
| SECURITY LEVEL | SECURITY LEVEL DEMANDED FOR ECU |
| KINDS OF SECURITY FUNCTIONS | KIND OF SECURITY FUNCTIONS OF ECU, MAC OR HASH IS USED FOR VERIFICATION OF SECURITY BOOT, AND THE LIKE |
| DOMAIN | INFORMATION INDICATING DOMAIN (ENERGY SYSTEM, BODY SYSTEM, AND THE LIKE) TO WHICH ECU PERTAINS |

FIG.5A

| ITEM | OVERVIEW |
|---|---|
| CAN ID | IDENTIFIER OF CAN MESSAGE WHEN COMMUNICATION ERROR OCCURS |
| ERROR INFORMATION | KIND OF ERRORS DEFINED IN CAN PROTOCOL |
| TIME INFORMATION | ERROR OCCURRENCE TIME |

FIG.5B

| ITEM | OVERVIEW |
|---|---|
| ECU ID | IDENTIFIER OF ECU |
| FW ID | IDENTIFIER OF CURRENT FIRMWARE |
| Ver.No | VERSION INFORMATION OF CURRENT FIRMWARE |
| ERROR INFORMATION | ERROR INFORMATION SUCH AS "RECOVERY" AND "VERIFICATION FAILURE" |
| TIME INFORMATION | ERROR OCCURRENCE TIME |

FIG.6

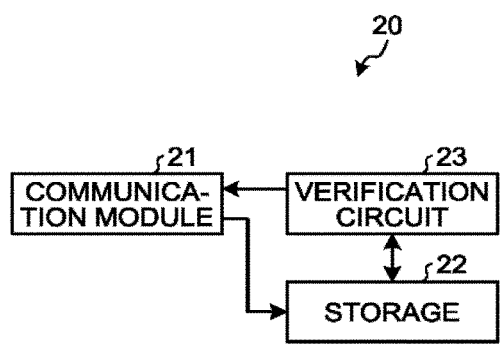

| ITEM | OVERVIEW |
|---|---|
| VEHICLE ID | IDENTIFIER OF VEHICLE |
| ECU ID | IDENTIFIER OF ECU |
| FW ID | IDENTIFIER OF CURRENT FIRMWARE |
| Ver.No | VERSION INFORMATION OF CURRENT FIRMWARE |
| ERROR INFORMATION | ERROR INFORMATION SUCH AS "RECOVERY" AND "VERIFICATION FAILURE" |
| TIME INFORMATION | ERROR OCCURRENCE TIME |

NETWORK MONITORING DEVICE, NETWORK SYSTEM, AND COMPUTER PROGRAM PRODUCT

CROSS-REFERENCE TO RELATED APPLICATIONS

This application is based upon and claims the benefit of priority from Japanese Patent Application No. 2016-178932, filed on Sep. 13, 2016; the entire contents of which are incorporated herein by reference.

FIELD

An embodiment described herein relates generally to a network monitoring device, a network system, and a computer program product.

BACKGROUND

For example, in an electronic device that is connected to a network, when software that is applied to (installed in) the electronic device is illegally altered, the electronic device does not normally operate, and thus there is a concern that the abnormal operation has an adverse effect on the entirety of the network. Accordingly, in the electronic device connected to the network, it is demanded to guarantee that the software applied to the electronic device is a regular one. As a method of checking rightness of the software, a verification function such as secure boot is known. The secure boot is a function of checking that software such as firmware is a regular one during activation of the electronic device. The software (program) is executed only in a case where the verification of the software by the secure boot succeeds, and the electronic device can be normally activated.

The secure boot is effective to secure reliability of the network, and an application to an electronic device such as an electronic control unit (ECU), which is connected to, for example, an in-vehicle network system, has been examined. However, when verification of the software by the secure boot fails, the electronic device becomes impossible to be activated, and it is necessary to consider a countermeasure when the verification fails. In addition, there is a demand for a mechanism capable of recovering the software of the electronic device, which fails in verification, in a convenient and safe manner without limitation to the secure boot.

BRIEF DESCRIPTION OF THE DRAWINGS

FIG. 3 is a block diagram illustrating a functional configuration example of GW;
FIG. 4 is a view illustrating a configuration example of an ECU management table;
FIGS. 5A and 5B are views illustrating a configuration example of a log;
FIG. 6 is a block diagram illustrating a functional configuration example of an ECU.

DETAILED DESCRIPTION

Figure 1:
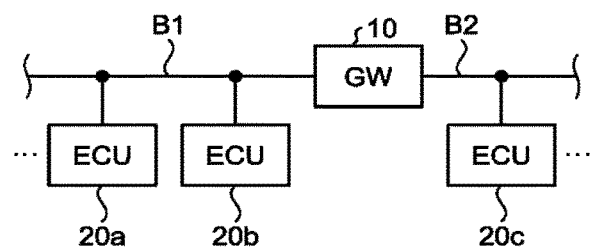
FIG. 1 is a view illustrating a schematic configuration of an in-vehicle network system.

According to an embodiment, a network monitoring device that monitors a network includes a software storage and a controller. The software storage is configured to store software applied to a first electronic device connected to the network. The controller is configured to determine, in response to reception of verification result data indicating software verification failure from the first electronic device, whether a recovery condition determined in advance as a condition of recovering software in the first electronic device is satisfied, and perform a control of transmitting the software stored in the software storage to the first electronic device when it is determined that the recovery condition is satisfied.

For example, a network monitoring device, a network system, and a program of an embodiment are applicable to an in-vehicle network system that is mounted in a vehicle. The in-vehicle network system is a network system in which a plurality of ECUs (an example of an electronic device) configured to control a vehicle perform a communication to each other. Typically, the in-vehicle network system includes an in-vehicle gateway device (hereinafter, abbreviated as "GW") that performs transmission of a message that is received and transmitted between the ECUs. The GW has a function of monitoring a network in many cases in order to appropriately determine whether the message can be transmitted. Hereinafter, description will be given of an example in which the GW provided to the in-vehicle network system is configured as a network monitoring device of this embodiment. However, devices or systems to which the GW is applicable are not limited to the following example. The embodiment is widely applicable to various network systems in which an electronic device performs a communication.

Overview of Embodiment

In this embodiment, it is assumed that the ECU connected to a network has a verification function of performing software verification so as to secure reliability of the in-vehicle network system. As an example of the verification function, a secure boot is assumed in this embodiment. In addition, as software that is a target to be verified, firmware that is applied to the ECU is assumed. In a case where the ECU uses the secure boot, a program of the firmware is executed only when verification succeeds, and the ECU can be normally activated. When verification fails, the ECU becomes impossible to be activated, and thus it is necessary to recover the firmware of the ECU by transmitting normal firmware to the ECU.

In this embodiment, to recover firmware of the ECU in a convenient and safe manner when the ECU fails in the verification by the secure boot and enters a state in which activation is impossible, the GW, which functions as a network monitoring device, stores current firmware that is applied to each ECU connected to a network. In addition, when receiving verification result data indicating verification failure from the ECU, the GW confirms that a security-related problem is not present in the in-vehicle network system, and then transmits firmware stored by the GW to the ECU that fails in firmware verification. The ECU, which receives the firmware from the GW, substitutes the firmware which fails in verification with the firmware received from the GW, thereby recovering the firmware. Furthermore, in this embodiment, as a verification function of verifying the firmware of the ECU, the secure boot is assumed, but other verification functions such as a verification function using a trusted platform module (TPM) other than the secure boot are also possible.

To confirm that the security-related problem is not present in the in-vehicle network system, in this embodiment, the GW requests another ECU (second electronic device) other than the ECU (first electronic device), which fails in the firmware verification, to verify firmware. For example, the other ECU that is a target to be requested to verify firmware may be the entirety of ECUs having a verification function with the secure boot, or an ECU that is required to have a security level equal to or higher than that of the ECU that fails in the firmware verification. It is also possible to perform firmware verification by a command transmitted from the GW with respect to an ECU of which power is not turned off. For example, when receiving verification result data, which indicates verification succession, from the entirety of ECUs which is requested to verify firmware, the GW can determine that the security-related problem is not present in the in-vehicle network system.

In addition, the GW has a function of recording and storing, as a log, data transmitted over the network and information relating to an operation of each of the ECUs connected to the network. The GW can also confirm that the security-related problem is not present in the in-vehicle network system by knowing the overall security situation of the in-vehicle network system through analysis of the log stored by the above-described function. For example, the GW can confirm that the security-related problem is not present in the in-vehicle network system by analyzing the log and confirming that a symptom of occurrence of the security-related problem is not present, and the number of times of firmware recovery in the past does not exceed a predetermined number of times in an ECU that fails in firmware verification, for example.

When receiving verification result data, which indicates verification failure, from the ECU that fails in firmware verification, the GW of this embodiment transmits firmware stored therein to the ECU that fails in the firmware verification under a condition in which it is confirmed that the security-related problem is not present in in-vehicle network system. That is, confirmation that the security-related problem is not present in the in-vehicle network system by the above-described method is a condition (recovery condition) of recovering firmware in the ECU that fails in firmware verification. In response to reception of the verification result data, which indicates verification failure, from the ECU that fails in firmware verification, the GW of this embodiment determines whether the recovery condition is satisfied and transmits firmware stored therein to the ECU that fails in the firmware verification when the recovery condition is satisfied, thereby recovering the firmware. Hereinafter, the embodiment will be described in more detail with reference to the accompanying drawings.

Overview of in-Vehicle Network System

FIG. 1 is a view illustrating a schematic configuration of the in-vehicle network system in this embodiment. As illustrated in FIG. 1, the in-vehicle network system includes a GW 10 configured as a network monitoring device, and a plurality of ECUs 20a, 20b, 20c, . . . (hereinafter, described as ECUs 20 in a case of being collectively called). In FIG. 1, three ECUs 20a, 20b, and 20c are illustrated. However, actually, more ECUs 20 are connected to a network. The plurality of ECUs 20 are disposed in a manner of being distributed to a plurality of buses, and transmit and receive a message to and from each other. FIG. 1 illustrates an example in which the ECU 20a and the ECU 20b are connected to a bus B1, and the ECU 20c is connected to a bus B2.

The GW 10 is connected to each of a plurality of buses which constitute transmission paths of the network. FIG. 1 illustrates an example in which the GW 10 is connected to both of the bus B1 and the bus B2. In a case where an ECU 20 on an arbitrary bus transmits a message to an ECU 20 on another bus, the GW 10 performs transmission of the message. In this embodiment, it is assumed that respective ECUs 20 perform a communication in conformity to a protocol of a controller area network (CAN). The GW 10 in this embodiment has a function of recovering firmware in the above-described ECUs 20 in addition to an intrinsic function of relaying a communication between the ECUs 20.

The configuration of the in-vehicle network system in FIG. 1 is illustrative only, and the configuration is not limited to the example. In addition, a communication method is not limited to the CAN, and may be other communication methods such as FlexRay (registered trademark). In addition, a configuration, in which other sub-networks different in a communication method are connected to each other through the GW 10, is also possible. In addition, in this embodiment, it is assumed that the GW 10 has a function as a network monitoring device. However, one or more different ECUs 20 may have the function as the network monitoring device instead of the GW 10 or in combination with the GW 10. In addition, a configuration, in which a network monitoring device different (independent) from the GW 10 or the ECUs 20 is connected to the in-vehicle network system, is also possible.

Hardware Configuration

Figure 2:
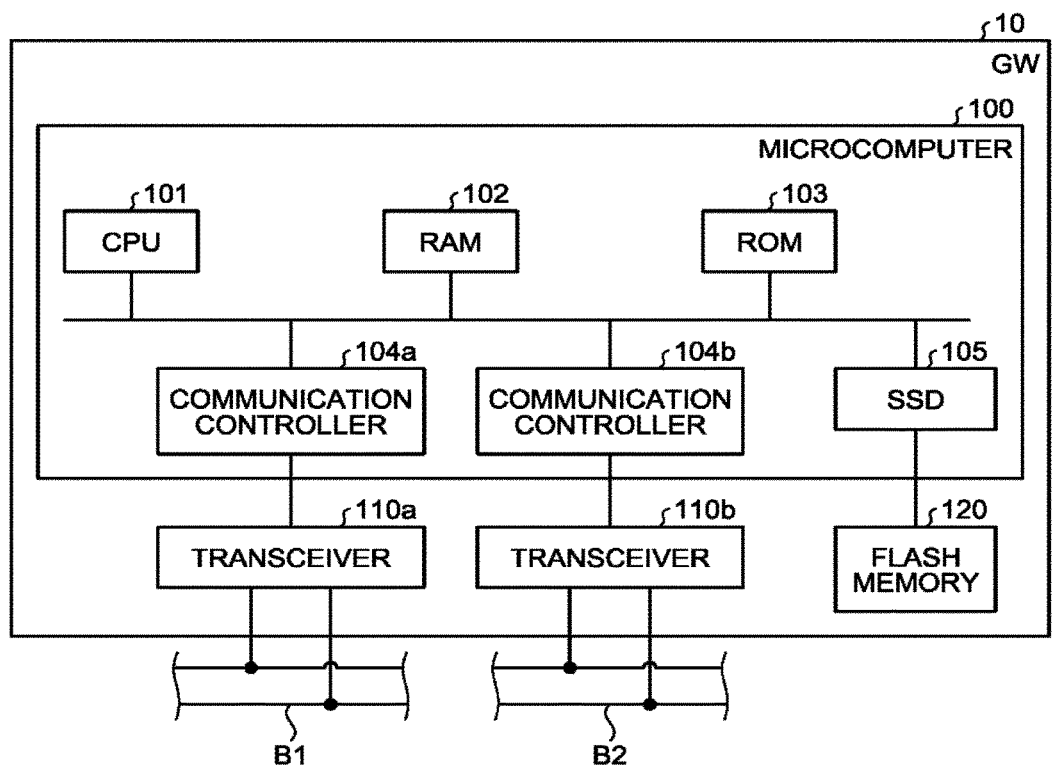
FIG. 2 is a block diagram illustrating a hardware configuration example of GW.

FIG. 2 is a block diagram illustrating a hardware configuration of the GW 10 in this embodiment. For example, as illustrated in FIG. 2, the GW 10 includes a microcomputer 100, a transceiver 110a that is connected to the bus B1, a transceiver 110b that is connected to the bus B2, and a flash memory 120. The transceivers 110a and 110b are transmitting and receiving devices which perform an analog process such as a process of converting a differential potential in the buses B1 and B2 into a digital signal, and a process of converting the digital signal into the differential potential. The flash memory 120 is a large-capacity storage device that stores various pieces of data stored in the GW 10, for example, an ECU management table to be described later, firmware that is applied to the respective ECUs 20, a log that is recorded, and the like.

The microcomputer 100 is an integrated circuit that performs digital signal processing, and includes a CPU 101, a RAM 102, a ROM 103, a communication controllers 104a and 104b, and a solid state drive (SSD) 105, and the like which are mounted. The CPU 101 is a processor that executes a predetermined program to control an overall operation of the GW 10. The RAM 102 is a memory that becomes a work area when the CPU 101 executes the program, and the ROM 103 is a memory that stores the program that is executed by the CPU 101, or data. The communication controllers 104a and 104b are controllers which perform transmission of a message that is transmitted and received between the buses B1 and B2 in cooperation with the transceivers 110a and 110b. The SSD 105 is a device that controls writing or reading of data with respect to the flash memory 120.

Furthermore, FIG. 2 illustrates the hardware configuration example of the GW 10, but a hardware configuration of each of the ECUs 20 is basically the same as the hardware configuration of the GW 10 in FIG. 2. In the configuration example in FIG. 2, it is assumed that the GW 10 is connected to the two buses B1 and B2, and the two transceivers 110a and 110b and the two communication controllers 104a and 104b in the microcomputer 100, which correspond to the two buses B1 and B2, are provided to the GW 10. However, the ECU 20 may be provided with a transceiver and a communication controller which correspond to a bus to which the ECU 20 is connected.

Functional Configuration of GW

FIG. 3 is a block diagram illustrating a functional configuration example of the GW 10 in this embodiment. As illustrated in FIG. 3, the GW 10 includes a communication module 11, a recovery controller 12 (controller), a log recorder 13, and a storage 14 as functional constituent elements relating to recovery of firmware in the ECU 20. The storage 14 includes a software storage 15, a table storage 16, and a log storage 17.

The functional constituent elements of the GW 10 illustrated in FIG. 3 can be implemented by cooperation of the hardware illustrated in FIG. 2 and software (program) as an example. For example, the communication module 11 can be implemented by the communication controllers 104a and 104b, in the microcomputer 100 and the transceivers 110a and 110b. For example, the recovery controller 12 can be implemented when the CPU 101 in the microcomputer 100 uses the RAM 102 as a work area, and reads and executes a program stored in the ROM 103. For example, the log recorder 13 can be implemented by a program that is executed by the CPU 101 in the microcomputer 100, and the SSD 105. For example, the storage 14 can be implemented by the SSD 105 in the microcomputer 100 and the flash memory 120.

The communication module 11 has a function of performing data exchange with a communication module 21 (refer to FIG. 6) of the ECU 20 connected to a network through a transmission path of the network. For example, the communication module 11 receives verification result data from the ECU 20 connected to the network, or transmits a verification request or firmware to the ECU 20 that is designated by the recovery controller 12.

The recovery controller 12 has a function of controlling recovery of the firmware in the ECU 20 connected to the network. In a case where the communication module 11 receives verification result data, which indicates firmware verification failure through the secure boot, from the ECU 20 (first electronic device) that is connected to the network, the recovery controller 12 determines whether a recovery condition, which is determined in advance as a condition for recovery of the firmware in the ECU 20, is satisfied. In addition, in a case of determining that the recovery condition is satisfied, the recovery controller 12 acquires firmware corresponding to the ECU 20 serving as a transmission source of the verification result data from the software storage 15, and performs a control of transmitting the acquired firmware from the communication module 11 to the ECU 20 that is the transmission source of the verification result data.

In this embodiment, it is assumed that the following three conditions including Condition 1, Condition 2, and Condition 3 are determined as the above-described recovery condition.

Condition 1: Another ECU 20 (second electronic device), other than the ECU 20 (first electronic device) that fails in the firmware verification, does not fail in firmware verification.

When the communication module 11 receives the verification result data, which indicates the firmware verification failure, from an arbitrary ECU 20 on the network, the recovery controller 12 performs a control of transmitting a firmware verification request from the communication module 11 to the other ECU 20 other than the ECU 20 that fails in the firmware verification. Then, when the communication module 11 receives a verification result data, which indicates verification success as a response to the verification request, from an ECU 20 other than the ECU 20 that is requested to verify firmware, the recovery controller 12 determines that Condition 1 is satisfied. Here, for example, the other ECU 20 serving as a target to be requested to verify firmware may be the entirety of ECUs 20 which has a verification function by the secure boot, or an ECU 20 that is required to have a security level equal to or higher than that of the ECU 20 that fails in the firmware verification.

Condition 2: A log, which indicates a symptom of occurrence of a security-related problem in the in-vehicle network system, has not been recorded.

The recovery controller 12 analyzes the log that is recorded by the log recorder 13 to be described later and is stored in the log storage 17. When it is confirmed that the log, which indicates a symptom of occurrence of the security-related problem in the in-vehicle network system, has not been recorded, the recovery controller 12 determines that Condition 2 is satisfied. Here, examples of the symptom of occurrence of the security-related problem in the in-vehicle network system include a situation in which a communication error frequently occurs on the network after firmware is updated in the ECU 20, and the like. This situation can be confirmed by analyzing the log recorded by the log recorder 13 to be described later and stored in the log storage 17.

Condition 3: The number of recording times of a log, which indicates that recovery of firmware has been performed in the past in the ECU 20 that fails in the firmware verification, is equal to or less than a predetermined number of times.

The recovery controller 12 analyzes the log recorded by the log recorder 13 to be described later and stored in the log storage 17. When it is confirmed that the number of recording times of the log, which indicates that recovery of the firmware has been performed in the past in the ECU 20 that fails in the firmware verification, is equal to or less than a predetermined number of times, the recovery controller 12 determines that Condition 3 is satisfied. When firmware is transmitted to the ECU 20 that fails in the firmware verification through a control of the recovery controller 12, the log recorder 13 to be described later records recovery of the firmware in the ECU 20 as a log so as to enable the determination of Condition 3.

For example, when all of Condition 1 to Condition 3 are satisfied, the recovery controller 12 performs a control of transmitting, to the ECU 20 that fails in the firmware verification to recover the firmware in the ECU 20, firmware corresponding to that ECU 20. Furthermore, Condition 1 to Condition 3 are examples of the recovery condition, and there is no limitation thereto. For example, any one of Condition 1 to Condition 3, or an arbitrary combination thereof may be determined in advance as the recovery condition, and conditions other than Condition 1 to Condition 3 may be included.

The log recorder 13 has a function of recording, as a log, data transmitted over the network, and information relating to an operation of the respective ECUs 20 connected to the network. Examples of the information relating to data transmitted over the network include a communication history of a message, a history of a communication error that occurs on the network, and the like. Examples of the information relating to the operation of the respective ECUs 20 connected to the network include a history of firmware updating or a recovery operation in the respective ECUs 20, and the like. The information, which is recorded as a log by the log recorder 13, is not limited to the data transmitted over the network and the information relating to the operation of the respective ECUs 20 connected to the network, and may include other pieces of information capable of being recorded as a log form.

The software storage 15 has a function of storing actual data (for example, a program body) of firmware that is currently applied to the ECU 20 (first electronic device) connected to the network, and related data (for example, an identifier (ECU ID) of the ECU 20 to which the firmware is applied). Hereinafter, the actual data of the firmware that is currently applied to the ECU 20 is referred to as "current firmware". The software storage 15 may has a configuration of storing the current firmware and the related data with respect to the entirety of ECUs 20 connected to the network, or a configuration of storing the current firmware and the related data with respect to only an ECU 20, which has a verification function by the secure boot, among the ECUs 20 connected to the network.

The table storage 16 has a function of storing an ECU management table indicating a correspondence relationship between an identifier (ECU ID) of the ECU 20 connected to the network, and an identifier (FW ID) of the current firmware. The recovery controller 12 refers to the ECU management table stored in the table storage 16, thereby specifying the current firmware corresponding to an ECU 20 that is a transmission source of the verification result data, among a plurality of pieces of current firmware stored in the software storage 15.

A configuration example of the ECU management table stored in the table storage 16 is illustrated in FIG. 4. For example, as illustrated in FIG. 4, the ECU management table includes "Ver. No" that is version information of the current firmware, "Verification reference value", "Security level", "Kinds of security functions", and "Domain" as items in addition to the "ECU ID" that is an identifier of the ECU 20, and the "FW ID" that is an identifier of the current firmware. For example, the ECU management table stored in the table storage 16 is a table including information of the items illustrated in FIG. 4 for each ECU 20.

"Verification reference value" is a value that is used for the firmware verification by the secure boot, and is a value that is shared with the ECUs 20 in advance. In a case of using a message authentication code (MAC) in the firmware verification by the secure boot, an MAC value, which is shared with the ECU 20 in advance, becomes the verification reference value. In a case of using a hash in the firmware verification by the secure boot, a hash value, which is shared with the ECU 20 in advance, becomes the verification reference value. In a case where the ECU 20 performs the firmware verification by the secure boot, when a verification value (the MAC value or the hash value), which is calculated from the firmware, matches the verification reference value that is shared with the GW 10 in advance, verification succeeds. When the matching is not established, verification fails.

"Security level" is a security level that is required for the ECU 20. The security level represents an influence degree of a function on safe driving of a vehicle. Examples of the security level include a level that is determined as an automotive safety integrity level (ASIL) of ISO26262, and a security level of an ECU 20 of an energy system is higher than a security level of an ECU of a body system.

"Kinds of security functions" is information indicating the kinds of security functions of the ECU 20. For example, information indicating that the MAC or the hash is used for verification by the secure boot is stored as the kind of security functions.

"Domain" is information indicating a domain to which the ECU 20 pertains. The domain is a group in a case of grouping the ECUs 20 in accordance with a function, and examples thereof include a body system domain constituted by a door, a mirror, and the like, and an energy system domain constituted by an engine, a brake, and the like, for example.

The log storage 17 has a function of storing a log that is recorded by the log recorder 13. The recovery controller 12 analyzes the log stored in the log storage 17, thereby determining whether Condition 2 or Condition 3 is satisfied.

A configuration example of the log, which is stored in the log storage 17, is illustrated in FIGS. 5A and 5B. FIG. 5A illustrates a configuration example of a log of a communication error in conformity to definition of a CAN protocol, and FIG. 5B illustrates a configuration example of a log of an operation error relating to the secure boot in the ECU 20.

For example, as illustrated in FIG. 5A, the log of the communication error includes "CAN ID", "Error information", and "Time information" as items. "CAN ID" is an identifier of a CAN message when an error occurs. "Error information" is information indicating the kinds of errors which are defined in the CAN protocol. "Time information" is information indicating error occurrence time. Furthermore, in a case of using a protocol other than CAN as a network communication protocol, items included in the log of the communication error may be set in advance in accordance with definition of a communication protocol that is used.

For example, as illustrated in FIG. 5B, the log of the operation error includes "ECU ID", "FW ID", "Ver. No", "Error information", and "Time information" as items. "ECU ID" is an identifier of an ECU 20 in which an error occurs. "FW ID" is an identifier of current firmware of the ECU 20, and "Ver. No" is version information of the current firmware of the ECU 20. "Error information" is information indicating the kinds of errors (in a case of an operation error relating to the secure boot, "recovery", "verification failure", and the like). Furthermore, "recovery" represents that firmware that fails in verification in the ECU 20 is recovered. In this embodiment, when the recovery controller 12 recovers the firmware of the ECU 20, the log recorder 13 records the information as the log of the operation error although the error is not strictly the operation error. "Time information" is information indicating error occurrence time.

Functional Configuration of ECU

FIG. 6 is a block diagram illustrating a functional configuration example of the ECU 20. As illustrated in FIG. 6, the ECU 20 includes a communication module 21, a storage 22, and a verification circuit 23 as functional constituent elements relating to the firmware verification. The functional constituent elements of the ECU 20 as illustrated in FIG. 6 can be implemented by cooperation of the same hardware and the same software (program) as in the GW 10 illustrated in FIG. 2 as an example.

The communication module 21 has a function of performing data exchange with the communication module 11 of the GW 10 through a transmission path of the network. For example, the communication module 21 transmits verification result data corresponding to a firmware verification result obtained by the verification circuit 23 to the GW 10, or receives current firmware or a verification request from the GW 10.

The storage 22 has a function of storing firmware of the ECU 20. The firmware that is stored in the storage 22 is a set of a program body and execution data. Specific examples of the execution data include a verification value of the firmware.

The verification circuit 23 has a function of performing verification by the secure boot on the firmware stored in the storage 22. The firmware verification by the secure boot is performed as follows. Specifically, the storage 22 calculates a verification value of the firmware stored in the storage 22, and compares the calculated verification value with a verification reference value that is stored in advance. When the calculated verification value matches the verification reference value, the firmware verification by the secure boot succeeds. When the calculated verification value and the verification reference value do not match each other, the firmware verification by the secure boot fails. The firmware stored in the storage 22 is executed only when the verification by the secure boot succeeds, and thus the ECU 20 normally operates. When the firmware verification by the secure boot fails, verification result data indicating verification failure is transmitted from the communication module 21 to the GW 10, and current firmware is received from the GW 10. In a case where the verification circuit 23 performs firmware verification in response to the verification request from the GW 10, even when the verification succeeds or fails, verification result data indicating the verification result is transmitted from the communication module 21 to the GW 10.

Procedure of Secure Boot

Figure 7:
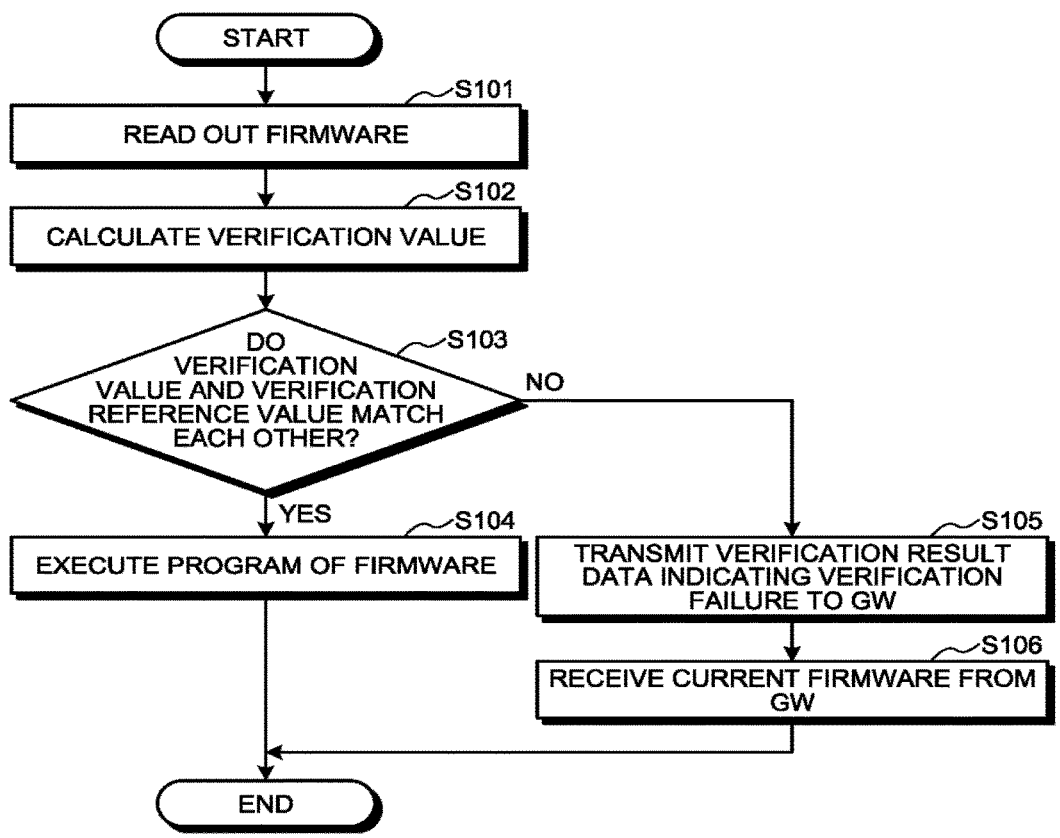
FIG. 7 is a flowchart illustrating an example of a procedure of a secure boot.

FIG. 7 is a flowchart illustrating an example of a procedure of the secure boot that is executed by the verification circuit 23 of the ECU 20. A series of processes illustrated in FIG. 7 starts, for example, when power is supplied to the ECU 20.

When a process illustrated in FIG. 7 starts, first, the verification circuit 23 reads out firmware from the storage 22 (step S101). The verification circuit 23 calculates a verification value of the firmware that is read out in step S101 (step S102).

Next, the verification circuit 23 compares the verification value that is calculated in step S102 with the verification reference value that is stored in advance, and determines whether the verification value matches the verification reference value (step S103). When the verification value matches the verification reference value (Yes in step S103), a program of the firmware is executed (step S104), and the ECU 20 normally boots, and thus the process of the secure boot is terminated.

When the verification value does not match the verification reference value (No in step S103), verification result data, which indicates verification failure, is transmitted from the communication module 21 to the GW 10 (step S105). For example, the verification result data includes an identifier (ECU ID) of the ECU 20, the verification value of the firmware which is calculated in step S102, and the like. In addition, an identifier (FW ID) of the firmware that fails in verification, and version information (Ver. No) may be included in the verification result data. Furthermore, the calculation of the verification value in step S102 is limited to the program of the firmware in this embodiment, but verification for the entirety of data which includes the program is also possible as necessary.

Then, the communication module 21 receives current firmware transmitted from the GW 10 (step S106). The current firmware received from the GW 10 is stored in the storage 22. Hereinbefore, description has been given of the procedure of the secure boot that starts when power is supplied to the ECU 20, but even in a case where the communication module 21 receives a firmware verification request from the GW 10, the firmware verification is performed in the same procedure. However, in a case of performing the firmware verification in response to the verification request from the GW 10, not only a case where the verification value calculated in step S102 and the verification reference value stored in advance do not match (No in step S103) but also a case where the verification value matches the verification reference value (Yes in step S103), the verification result data (in this case, verification result data indicating verification success) is transmitted from the communication module 21 to the GW 10.

Procedure of Firmware Recovery Process

Figure 8:
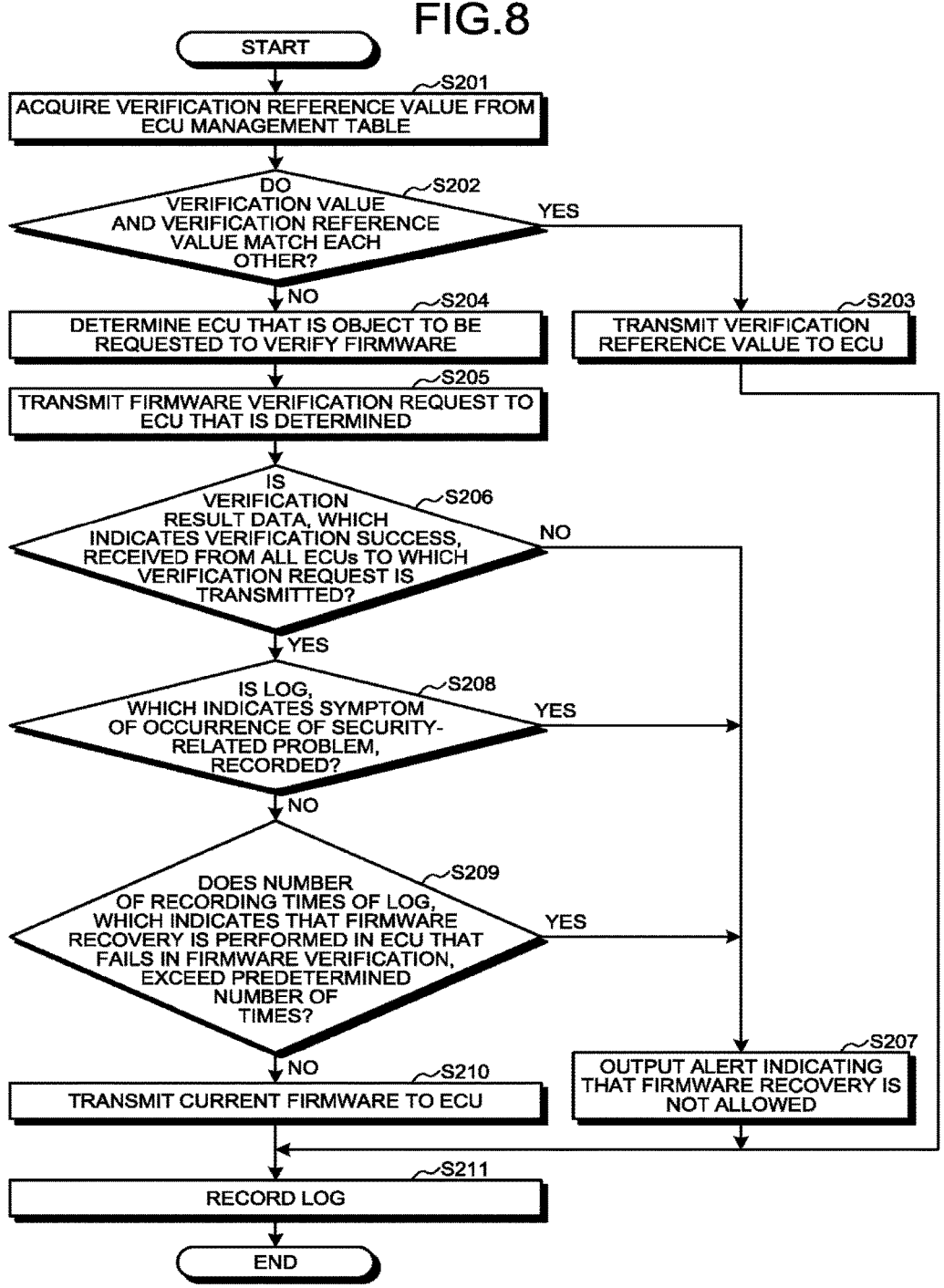
FIG. 8 is a flowchart illustrating an example of a procedure of a firmware recovery process.

FIG. 8 is a flowchart illustrating an example of a procedure of the firmware recovery process that is executed by the recovery controller 12 of the GW 10. A series of processes illustrated in FIG. 8 starts when the communication module 11 of the GW 10 receives verification result data indicating firmware verification failure from an arbitrary ECU 20 on the network.

When a process illustrated in FIG. 8 starts, first, the recovery controller 12 searches the ECU management table stored in the table storage 16 by using the ECU ID, which is included in the verification result data received by the communication module 11, as a key to acquire a verification reference value corresponding to an ECU 20 that is a transmission source of the verification result data (step S201).

Next, the recovery controller 12 compares a verification value included in the verification result data received by the communication module 11 with the verification reference value acquired in step S201, and determines whether the verification value matches the verification reference value (Step S202). Here, when the matching is established (Yes in step S202), it can be determined that the firmware verification fails due to a fault (variation, damage) of the verification reference value stored in the ECU 20. Accordingly, the recovery controller 12 performs a control of transmitting the verification reference value acquired in step S201 from the communication module 11 to the ECU 20 that is a transmission source of the verification result data (step S203). According to this, it is possible to recover the verification reference value of the ECU 20. In this case, the log recorder 13 records a log indicating that the verification reference value of the ECU 20 has been recovered (step S211), and the firmware recovery process is terminated. Then, the ECU 20 executes the secure boot process again by using the verification reference value that has been recovered, and thus normally operates.

The verification value, which is included in the verification result data, does not match the verification reference value acquired in step S201 (No in step S202), the recovery controller 12 determines an ECU 20 that is a target to be subsequently requested to verify firmware (step S204), and performs a control of transmitting a firmware verification request from the communication module 11 to the ECU 20 that is determined in step S204 (step S205). As described above, the ECU 20 that is a target to be requested to verify firmware may be the entirety of ECUs 20 (ECUs 20 having the same security function as that of the ECU 20 that fails in the firmware verification) which has a verification function by the secure boot, or an ECU 20 that is required to have a security level that is equal to or higher than that of the ECU 20 that fails in the firmware verification. For example, the recovery controller 12 refers to the ECU management table stored in the table storage 16, thereby determining the ECU 20, which is a target to be requested to verify firmware.

Then, the recovery controller 12 determines whether verification result data indicating verification success is received from the entirety of ECUs 20 to which a verification request is transmitted from the communication module 11 (step S206). When the verification result data indicating verification failure is received from any one of ECUs 20, or when an ECU 20 from which the verification result data cannot be received is present (No in step S206), the recovery controller 12 performs a control of outputting alert indicating that firmware recovery is not allowed (step S207). Examples of the alert include presentation of an alert mark on a meter panel of a vehicle, and the like. In this case, the log recorder 13 records an operation error log indicating firmware verification failure in step S211, and the firmware recovery process is terminated. For example, the log is stored in the log storage 17 as a log of the operation error illustrated in FIG. 5B.

When receiving verification result data indicating verification success from the entirety of ECUs 20 to which the verification request is transmitted (Yes in step S206), the recovery controller 12 analyzes a log stored in the log storage 17 to determine whether a log, which indicates a symptom of occurrence of the security-related problem in the in-vehicle network system, has been recorded (step S208). Here, when it is determined that the log indicating the symptom of occurrence of the security-related problem in the in-vehicle network system has been recorded (Yes in step S208), the recovery controller 12 performs a control of outputting alert indicating that firmware recovery is not allowed in step S207. In addition, in step S211, the log recorder 13 records an operation error log indicating firmware verification failure, and the firmware recovery process is terminated.

When it is determined that the log, which indicates the symptom of occurrence of the security-related problem in the in-vehicle network system, has not been recorded (No in step S208), the recovery controller 12 analyzes a log stored in the log storage 17 to determine whether the number of recording times of a log, which indicates that firmware recovery has been performed in the past, exceeds a predetermined number of times in the ECU 20 that fails in the firmware verification (step S209). When the number of recording times of the log, which indicates that firmware recovery has been performed in the past, exceeds the predetermined number of times (Yes in step S209), the recovery controller 12 performs a control of outputting alert indicating that firmware recovery is not allowed in step S207. In addition, the log recorder 13 records an operation error log indicating firmware verification failure in step S211, and the firmware recovery process is terminated.

In the ECU 20 that fails in the firmware verification, when the number of recording times of the log, which indicates that firmware recovery has been performed in the past, is equal to or less than a predetermined number of times (No in step S209), the recovery controller 12 determines that a recovery condition, which is a condition of recovering firmware in the ECU 20 that fails in the firmware verification, is satisfied, and performs a control of transmitting current firmware stored in the software storage 15 from the communication module 11 to the ECU 20 (step S210). For example, the recovery controller 12 searches the ECU management table stored in the table storage 16 by using the ECU ID, which is included in the verification result data received from the ECU 20, as a key to acquire an FW ID corresponding to the ECU 20. In addition, the recovery controller 12 reads out the current firmware, which is identified by the acquired FW ID, from the software storage 15, and transmits the current firmware from the communication module 11 to the ECU 20. Furthermore, when an FW ID or a Ver. No of firmware, which fails in verification in the ECU 20, is included in the verification result data, the current firmware, which is transmitted to the ECU 20, may be specified based on the information.

When the current firmware stored in the software storage 15 is transmitted to the ECU 20 that fails in the firmware verification by the control of the recovery controller 12, the log recorder 13 records a log, which indicates that the firmware of the ECU 20 has been recovered, in step S211, and the firmware recovery process is terminated. For example, the log is stored in the log storage 17 as a log of the operation error illustrated in FIG. 5B.

Effect of Embodiment

Hereinbefore, as illustrated in detail with reference to a specific example, in this embodiment, the GW 10 of the in-vehicle network system stores the current firmware of respective ECUs 20 connected to the network. In addition, when receiving verification result data indicating firmware verification failure from an arbitrary ECU 20, the GW 10 determines whether the recovery condition is satisfied. In a case where it is determined that the recovery condition is satisfied, the GW 10 transmits the current firmware, which corresponds to the ECU 20, to the ECU 20 that is a transmission source of the verification result data to recover the current firmware. Accordingly, according to this embodiment, it is possible to recover the firmware of the ECU 20 that fails in verification in a convenient and safe manner.

As a method of recovering the firmware of the ECU 20 that fails in verification, for example, the following method is considered. Specifically, the in-vehicle network system is connected to an external server such as an OEM server, and the current firmware of the ECU 20 that fails in verification is downloaded from the external server. However, this method is executed on the assumption that the in-vehicle network system (that is, a vehicle) is in an environment capable of being connected to the external server. Accordingly, in a case where the vehicle is not under the environment, the firmware of the ECU 20 cannot be recovered, and thus there is a concern that the vehicle may become impossible to be driven. In addition, the external server is not able to know a security situation of the in-vehicle network system, and thus the current firmware of the ECU 20 is downloaded from the external server regardless of occurrence of the security-related problem in the in-vehicle network system. Accordingly, there is also a concern that the problem gets worse.

In contrast, according to this embodiment, the GW 10 in the in-vehicle network system stores the current firmware of the ECU 20, and after determining that the security-related problem is not present in the in-vehicle network system through a determination as to whether the recovery condition is satisfied, the current firmware corresponding to the ECU 20 is transmitted to the ECU 20 that fails in the firmware verification. Accordingly, it is possible to recover the firmware of the ECU 20 that fails in verification in a convenient and safe manner.

In this embodiment, various modification examples are considered. Hereinafter, description will be given of several of the modification examples.

First Modification Example

In the above-described embodiment, the GW 10 requests the entirety of ECUs 20 having the verification function by the secure boot, or an ECU 20 that is required to have a security level equal to or higher than that of an ECU 20 that fails in firmware verification, to verify firmware for determination of Condition 1. However, a target to be requested to verify firmware is not limited to such ECU(s) 20. For example, an ECU 20, which pertains to the same domain as the ECU 20 that fails in the firmware verification may be added as the target to be requested to verify firmware. For example, the ECU 20, which pertains to the same domain as the ECU 20 that fails in the firmware verification may be particularly designated by referring to the ECU management table stored in the table storage 16.

Second Modification Example

In the above-described embodiment, in a case where the firmware verification is performed by the secure boot in the ECU 20, one firmware verification value is calculated, and the verification value is compared with one verification reference value stored in advance. However, verification may be made by dividing the firmware into a program and setting data. In this case, a program verification value and a setting data verification value of the firmware are calculated. In addition, the program verification value is compared with a verification reference value that is used in program verification, and the setting data verification value is compared with a verification reference value that is used in setting data verification. A program may be configured to be executed when the respective verification values and the respective verification reference values match each other. In this case, the verification reference value that is used in the program verification, and the verification reference value that is used in the setting data verification are stored in the ECU 20. In addition, the verification reference value that is used in the program verification and the verification reference value that is used in the setting data verification are stored in the ECU management table that is stored in the table storage 16 of the GW 10.

Third Modification Example

In the above-described embodiment, the GW 10 analyzes the log stored in the log storage 17 for determination of Condition 2 and Condition 3. However, it is also possible to check whether the same security-related problem occurs, for example, in the same vehicle type of other vehicles and the like by also analyzing a log in the external server such as the OEM server.

Figures 9, 10:
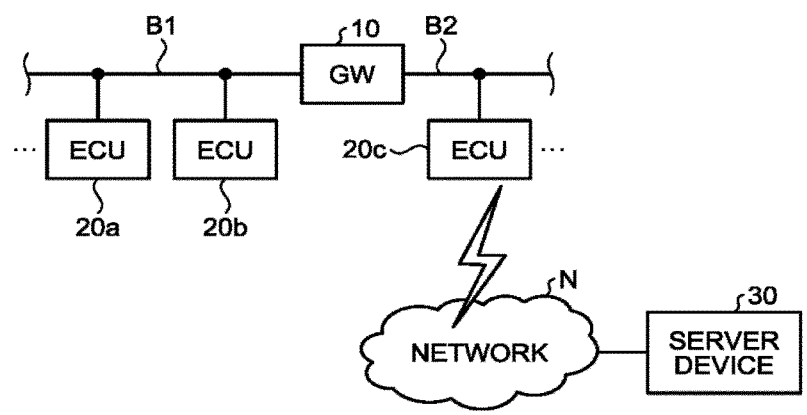
FIG. 9 is a view illustrating a schematic configuration of an in-vehicle network system.
FIG. 10 is a view illustrating a configuration example of a log that is stored by a server device.

FIG. 9 is a view illustrating a schematic configuration of an in-vehicle network system in this modification example. The configuration of the in-vehicle network system illustrated in FIG. 9 is basically the same as the configuration illustrated in FIG. 1 except that the ECU 20c connected to the bus B2 is connected to a digital communication module (DCM) (not illustrated in the drawing), and is capable of performing a communication with a server device 30 such as the OEM server on an outer side of a vehicle through a network N including a mobile communication network on an outer side of the vehicle.

In this modification example, when the GW 10 records the above-described log, information (for example, an operation error log of the ECU 20) helpful to fault diagnosis and the like in other vehicles is uploaded from the ECU 20c to the server device 30 through the network N. The server device 30 stores a log, which is received from the in-vehicle network system of an arbitrary vehicle, in an associated manner with an identifier (vehicle ID) of the vehicle. In addition, for example, when executing the firmware recovery process, the GW 10 accesses to the server device 30 from the ECU 20c through the network N to acquire a log of the same vehicle type of other vehicles, and analyzes the log of the same vehicle type of other vehicles in addition to the log that is stored in the GW 10. According to this, the GW 10 can determine whether the recovery condition is satisfied.

A configuration example of the log stored in the server device 30 is illustrated in FIG. 10. The log illustrated in FIG. 10 is an operation error log related to the secure boot of the ECU 20, and has a configuration in which an item of a vehicle ID that is an identifier of the vehicle is added to the operation error log stored in the GW 10 as illustrated in FIG. 5B.

Fourth Modification Example

The above-described embodiment is an example in which the embodiment is applied to the in-vehicle network system that is mounted in a vehicle. However, the embodiment can be widely applicable to various network systems in which electronic devices perform a communication. For example, an application to a home network system to which a home electronic appliance having a communication function is connected, and the like is considered. In the home network system, for example, a home gateway, which monitors a network, records and stores an operation history of a robot cleaner and the like as a log, and the home gateway may be provided with the same function as in the GW 10.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A network monitoring device that monitors a network, comprising:

a software storage, implemented in computer hardware, configured to store software applied to a first electronic device connected to the network; and a controller, implemented in computer hardware, configured to determine, in response to reception of verification result data indicating software verification failure from the first electronic device, whether a recovery condition determined in advance as a condition of recovering software in the first electronic device is satisfied, and perform a control of transmitting the software stored in the software storage to the first electronic device when it is determined that the recovery condition is satisfied; wherein when receiving the verification result data indicating software verification failure from the first electronic device, the controller requests a second electronic device connected to the network to verify software applied to the second electronic device, and the recovery condition includes a condition of receiving verification result data indicating software verification success from the second electronic device.

2. The device according to claim 1, wherein the second electronic device is an electronic device that is required to have a security level equal to or higher than a security level of the first electronic device.

3. The device according to claim 1, wherein the second electronic device pertains to the same domain as the first electronic device.

4. The device according to claim 1, further comprising:
a log recorder, implemented in computer hardware, configured to record, as a log, data transmitted over the network, and information relating to an operation of an electronic device connected to the network; and
a log storage, implemented in computer hardware, configured to store the log, wherein
the controller analyzes the log stored in the log storage to determine whether the recovery condition is satisfied.

5. The device according to claim 4, wherein the recovery condition includes a condition that a log indicating a symptom of occurrence of a security-related problem is not recorded.

6. The device according to claim 4, wherein the recovery condition includes a condition that the number of recording times of a log, which indicates that software recovery is performed in the first electronic device, is equal to or less than a predetermined times.

7. The device according to claim 1, further comprising:
a table storage, implemented in computer hardware, configured to store a table indicating a correspondence relationship between an identifier of the first electronic device and an identifier of software applied to the first electronic device, wherein
the verification result data includes the identifier of the first electronic device, and
the controller specifies software to be transmitted to the first electronic device based on the identifier of the first electronic device included in the verification result data, and the table.

8. The device according to claim 7, wherein
the table further includes an item indicating a verification reference value that is used by the first electronic device for software verification,
the verification result data further includes a verification value that is calculated when the first electronic device verifies software, and
when the verification value included in the verification result data and the verification reference value in the table are different from each other, and it is determined that the recovery condition is satisfied, the controller performs a control of transmitting the software stored in the software storage to the first electronic device.

9. The device according to claim 8, wherein when the verification value included in the verification result data and the verification reference value in the table match each other, the controller performs a control of transmitting the verification reference value in the table to the first electronic device.

10. The device according to claim 7, wherein the table further includes at least one of an item indicating version information of software applied to the first electronic device, an item indicating a security level that is required for the first electronic device, an item indicating the kind of security function of the first electronic device, and an item indicating a domain to which the first electronic device pertains.

11. A network system, comprising:
a first electronic device that is connected to a network; and
a network monitoring device that monitors the network, wherein the first electronic device includes,
a verification circuit, implemented in computer hardware, configured to perform software verification, and
a communication module, implemented in computer hardware, configured to transmit verification result data, which indicates verification failure when the software verification fails, to the network monitoring device, and receive software from the network monitoring device, and
the network monitoring device includes:
a software storage, implemented in computer hardware, configured to store software applied to the first electronic device, and
a controller, implemented in computer hardware, configured to
determine, in response to reception of verification result data indicating software verification failure from the first electronic device, whether a recovery condition determined in advance as a condition of recovering software in the first electronic device is satisfied, and
perform a control of transmitting the software stored in the software storage to the first electronic device when it is determined that the recovery condition is satisfied; wherein
when receiving the verification result data indicating software verification failure from the first electronic device, the controller requests a second electronic device connected to the network to verify software applied to the second electronic device, and the recovery condition includes a condition of receiving verification result data indicating software verification success from the second electronic device.

12. A computer program product comprising a non-transitory computer-readable medium containing a computer program that is executed by a computer, the computer monitoring a network and storing software applied to a first electronic device connected to the network, the program causing the computer to a function of:
determining, in response to reception of verification result data indicating software verification failure from the first electronic device, whether a recovery condition determined in advance as a condition of recovering software in the first electronic device is satisfied, and
performing a control of transmitting the software stored in the software storage to the first electronic device when it is determined that the recovery condition is satisfied: wherein
when receiving the verification result data indicating software verification failure from the first electronic device, the controller requesting a second electronic device connected to the network to verify software applied to the second electronic device, and the recovery condition includes a condition of receiving verification result data indicating software verification success from the second electronic device.

* * * * *